UNITED STATES PATENT OFFICE.

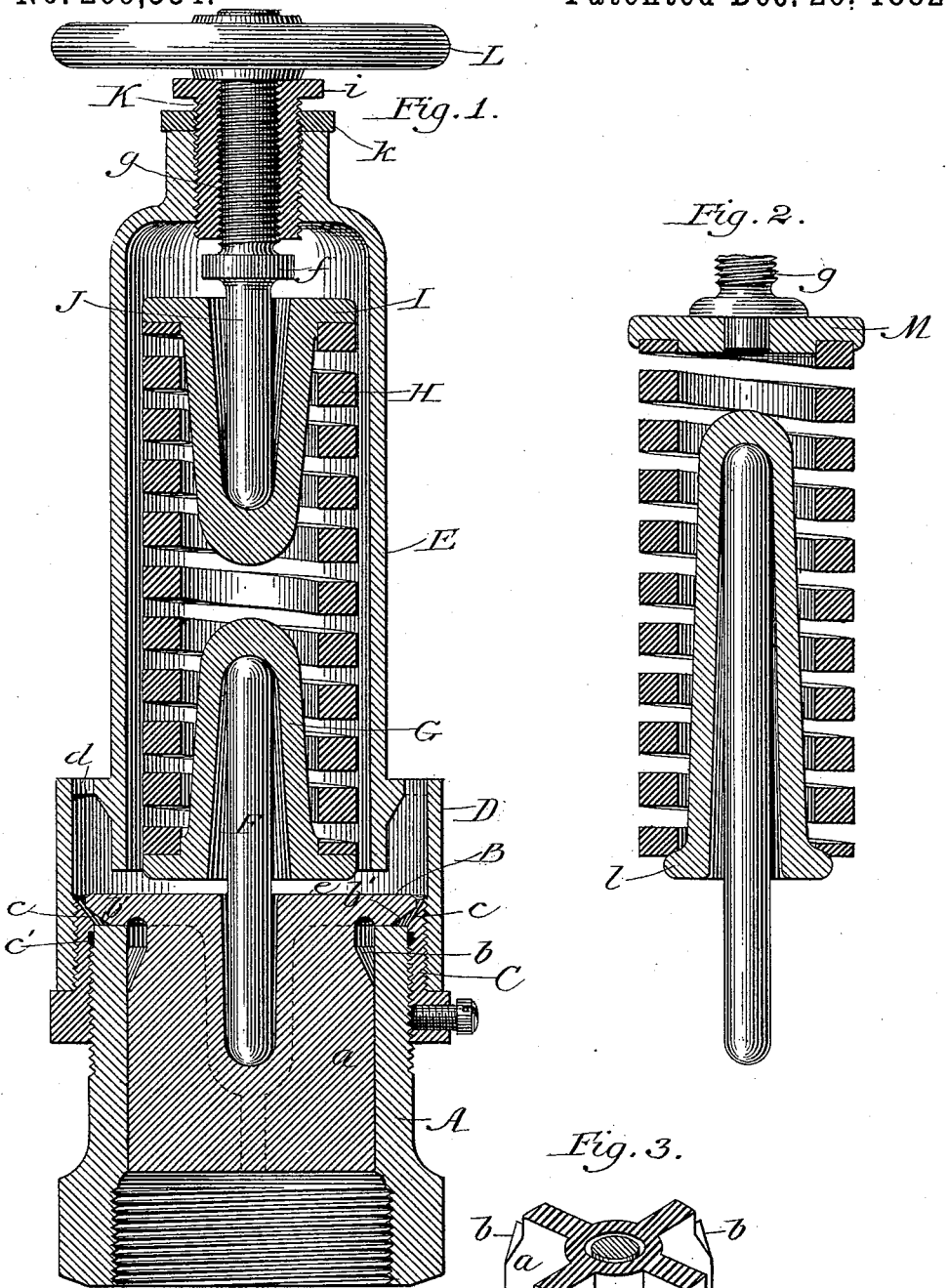

ALEXANDER ORME, OF CHICAGO, ILLINOIS.

SAFETY-VALVE.

SPECIFICATION forming part of Letters Patent No. 269,534, dated December 26, 1882.

Application filed August 7, 1882. (No model.)

*To all whom it may concern:*

Be it known that I, ALEXANDER ORME, a citizen of the United States, residing in Chicago, in the county of Cook and State of Illinois, have invented certain new and useful Improvements in Safety-Valves, of which the following is a specification.

My invention relates to safety-valves employed for relieving the steam-pressure in a boiler when the same verges beyond a pressure at which it is desired to run the boiler, which valves are provided with a spindle bearing at one end upon the valve and at the other end in a socket-piece covering a helical spring, provided with means inside the valve shell or case, connected directly with the spindle-socket piece for adjusting the tension of the spring, so as to cause a pressure upon the valve equal to the particular pressure at which it is desired to run the boiler, but which spring will release the valve and permit the excess of steam in the boiler to escape, the spindle and spindle-socket serving to equalize and maintain a direct pressure of the spring upon the valve, thereby preventing the valve from rocking when lifted by the excess of steam-pressure or when dropping upon its seat, hence securing an even distribution over the valve-surface of the steam in or escaping from the boiler.

The objects of my present invention are to provide a novel spindle-socket, forming a bearing for the helical spring and having no connection with the means for adjusting the spring save through the spring itself to adjust the tension of the helical spring, and hence the valve, from the outside of the valve-case; to provide for the employment of two independent spindle-socket pieces, forming bearings for the ends of the helical spring, one of which has its spindle forming a continuation of or connected with means accessible outside of the valve-case for adjusting the pressure of the valve; to provide said socket-pieces, whether one or more are used, with a novel form of bearing for and whereby the helical spring is movable and automatically adjustable upon the socket-pieces; to provide two or more valve-adjusting devices accessible from the outside of the valve-case, working upon but each adapted to be set independent of the other, so that as the pressure of the valve is decreased it may be set to the next adjustment without further manipulation of the adjusting devices, and so on until the valve exerts only its normal pressure. I attain these objects by devices llustrated in the accompanying drawings, in which—

Figure 1 represents a longitudinal section through a steam-valve embodying my invention; Fig. 2, a similar view of a modification of the same with the casings and valve removed; and Fig. 3, a perspective of the valve-wings, showing their bevel adjacent the valve.

Similar letters of reference indicate the same parts in the several figures of the drawings.

A represents a bushing internally screw-threaded at its lower end for connection with the dome of a boiler, and squared upon its upper end to form a seat for the valve B, the wings *a* of which have their bearings and are guided in the smooth-bored upper portion of the bushing, and are recessed and chamfered or beveled to the form of a wedge, as shown at *b*, next the valve, which rests upon and extends beyond the outer edges of the bushing. Chamfering, in addition to notching, the valve-wings decreases the friction of the steam over the otherwise sharp corners of the wings, and more evenly distributes the steam in its contact with the valve, thereby causing effectual operation of the valve by raising its entire surface simultaneously, evenly, and in a direct line from its seat, hence compelling the steam to escape in equal volume over the whole periphery of the valve and operate to establish the equilibrium of the valve with reference to its seat and the line of pressure of the adjusting devices for the same, which results are not attained when the wings are notched to form a square shoulder. The lower outer corner of the valve is beveled, as shown at *b*, and opposes an adjustable collar, C, screwed upon the outside of and projecting above the end of the bushing, where it is beveled, as shown at *c*, but at an oblique angle, approaching more toward a vertical line than that of the line formed by the beveled edge of the valve. By adjusting the collar upwardly or downwardly the area between it and the valve for the escape of steam is increased or diminished, as the case may be, for, as will be seen, if the collar be elevated from the position shown in Fig. 1 to contact with the upper corner of the beveled edge of the valve, then the area of escape at this point will be equal to that between the valve and its seat as the valve rises and until it is elevated to bring the upper corner of its beveled edge above the top of the collar; but it is necessary that space should exist between the two when the valve is on its seat to provide for the expanding of the escaping steam. Hence the operative position of the collar is slightly below that of the corner edge of the valve, a further provision for the expanding steam existing by reason of the difference in angle of the beveled edges of the collar and valve, forming an enlarged chamber toward and between the bases of these bevels.

Collar C is provided with a packing-ring, c', adjacent the bushing, and is externally screw-threaded to receive the valve-case D, which rests upon an annular flange at the base of the collar, through which flange passes a set-screw (see Fig. 1) for locking the collar after its adjustment upon the bushing.

Connected with the valve-case by radial arms d is a spring-case, E, projecting down into the valve-case to near the valve, the space between the two cases and the arms d serving as a port for the escape of the steam from the valve-case to the outer air; but it is obvious that instead of this connection the two cases may be connected in any other suitable manner and cast together or separately with openings in either or both cases for the escape of the steam.

Cast with the valve B, and with its wings, is a socket-piece, (see dotted lines in Fig. 1,) receiving a spindle, F, the upper end of which has its bearing in and against the end of a spindle-socket, G, having a rim, e, squared upon its upper face, (see Fig. 1,) to form a seat for a helical spring, H, a similar socket-piece, I, projecting downwardly inside the spring, opposing but not coming in contact with the lower spindle-socket, and receiving, in the same manner as the lower socket, a spindle, J, having an annular ring or flange, f, above which the spindle is screw-threaded, at g; or, in other words, the spindle J, ring f, and screw-threaded bolt g are cast in one piece, but may be made separately and connected together. The screw-threaded bolt g works in a bushing, K, which in turn works in the spring-case and provides for an adjustment of the spring, presently to be described, said bushing having at its upper end a flange, i, which serves as a hold for a wrench and to limit the downward movement of the bushing by contact with a washer, k, on the spring-case, and to form a bearing for a hand-wheel, L, keyed or working on the bolt g for operating said bolt to adjust the spring.

With the above construction, it will be seen that when it is desirable to compress the spring to gage the valve, say, for eighty pounds pressure the bolt g is run down, and by running down the bushing K the valve may at the same time be gaged for forty pounds, so that when relieved from the eighty pounds pressure by screwing up the bolt g the ring f will come against the bushing K, when the valve will be adjusted to forty pounds pressure, without any effort or calculation on the part of the operator. This double adjustment is very desirable when boilers are run night and day, for it is customary to run them at a much lower pressure at night, at which time and under which pressure the same skill on the part of the engineer is not required, and usually not employed; and, furthermore, it enables an unskilled man to successfully lower the pressure for night-work. Furthermore, after the bushing is once adjusted no further adjustment is required, except as the spring loses its tension, although run at a higher pressure at other and odd times. Another advantage of this construction is that the pressure of the valve may be set from the outside of the valve or spring-case, hence avoiding the present necessity of taking one or the other of these cases apart for this purpose.

It will also be observed that with two spindles and spindle-sockets the tendency of the spring, when under compression, to oscillate or exert an unequal pressure on the valve is prevented, for however much the spring may oscillate the spindle F is permitted and does maintain itself in a vertical position. Hence the line of pressure on the valve is in a direct line through its center, and this feature, in connection with the peculiar construction of the valve, renders the structure a perfectly-operative device. These advantages may be gained as well by the use of one as two spindles and spindle-sockets, as will be seen by a reference to Fig. 2, in which are shown an elongated spindle and corresponding spindle-socket, the spindle-socket having its flange convexed, as shown at l, and the spring being correspondingly chamfered, so that they may have a ball-and-socket movement upon each other and the spring adjust itself upon the flange. The upper end of the spring is confined by a plate, M, centrally perforated and forming a bearing for the bolt g, which is free to turn therein, so that when screwing it down, as shown in Fig. 1, the bolt will turn without turning the plate.

It may here be stated that one or both of the spindle-sockets in Fig. 1 may be convexed similar to the one shown in Fig. 2; but under ordinary circumstances this will not be necessary where two are employed, by reason of the corresponding number of spindles serving to make the necessary adjustment as regards the line of strain of the spring with reference to the valve.

Having thus described my invention, what I claim, and desire to secure by Letters Patent, is—

1. The combination, with the valve, the valve-spindle and its socket-piece, of an opposing socket-piece and spindle, and of a helical spring confined between said socket-pieces, and means, substantially as described, for adjusting said spring.

2. The combination, with a spring-case, the spring, the spindle, the spindle-socket, and the valve, of a screw-threaded adjusting-bolt engaging with said spring and projecting upon the outside of the case, substantially as described.

3. The combination, with the spring-case, the spring, and the valve, of the screw-threaded spring-adjusting bolt projecting through the case, and of an adjustable bushing working on said bolt and providing for a double adjustment of the valve, substantially as described.

4. The combination, in a safety-valve, of a helical actuating-spring chamfered upon its end, and a spindle-socket having a convex flange, forming a seat for the end of said spring, substantially as described.

5. The combination, with the valve, the valve-case, and the adjustable collar, of the spring and spring-case extending above but projecting into the valve-case, said cases being provided with steam-ports, and the collar screw-threaded and adjustable in the valve-case, substantially as described.

6. The combination, with the valve, of the radial valve-wings notched and chamfered next the valve, substantially as described.

ALEXANDER ORME.

Witnesses:
JNO. G. ELLIOTT,
W. W. ELLIOTT.